(No Model.)
P. J. MADDEN.
FLUSHING ATTACHMENT FOR WATER CLOSETS.
No. 569,560. Patented Oct. 13, 1896.
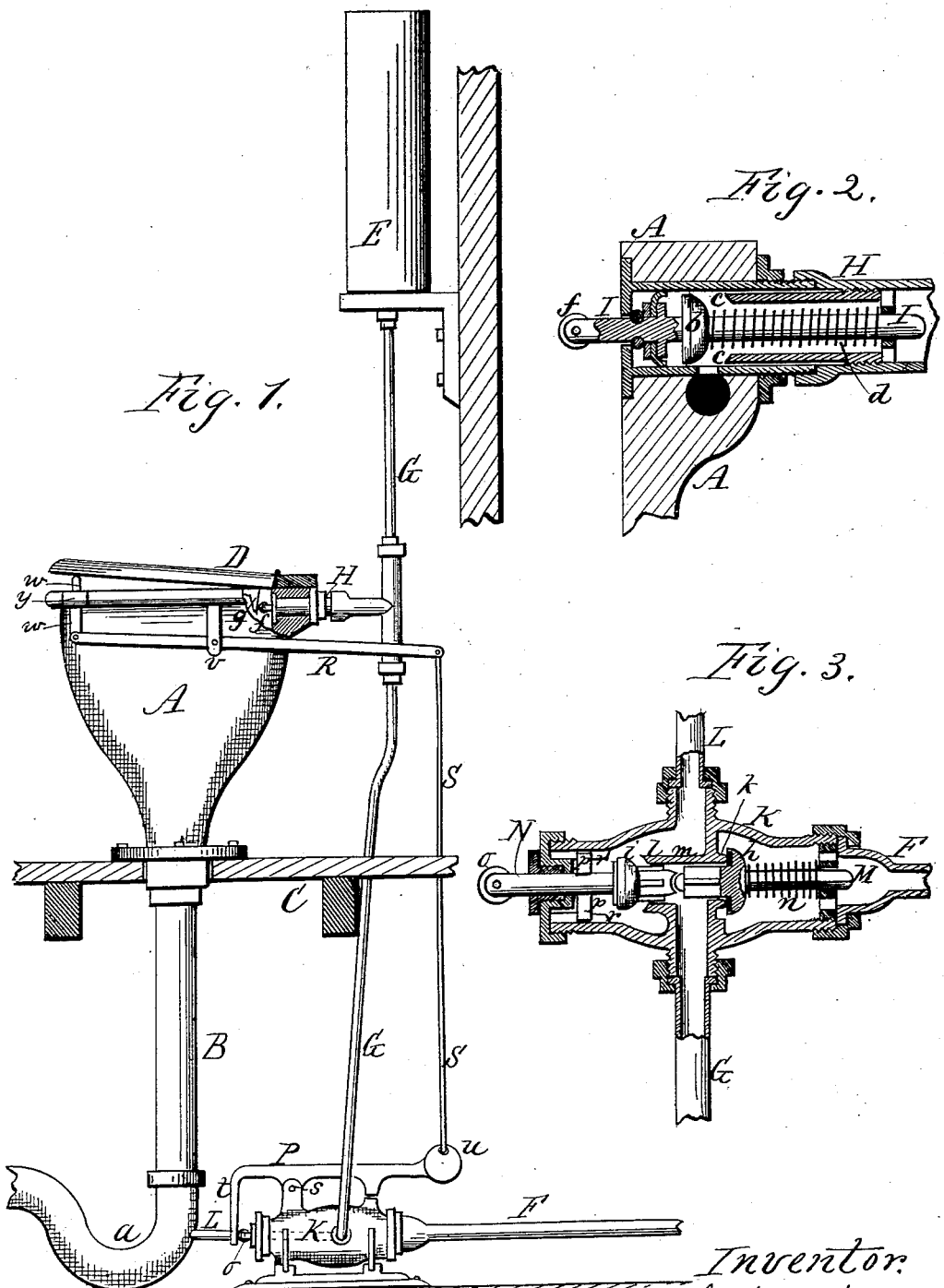

United States Patent Office.

PATRICK J. MADDEN, OF ROCHESTER, NEW YORK.

FLUSHING ATTACHMENT FOR WATER-CLOSETS.

SPECIFICATION forming part of Letters Patent No. 569,560, dated October 13, 1896.

Application filed March 10, 1893. Serial No. 465,406. (No model.)

*To all whom it may concern:*

Be it known that I, PATRICK J. MADDEN, of Rochester, in the county of Monroe and State of New York, have invented a certain new and useful Improvement in Flushing Attachments for Water-Closets; and I do hereby declare that the following is a full, clear, and exact description of the same, reference being had to the drawings accompanying this application.

My improvement relates to antifreezing attachments, and is of that class in which the mechanism which controls the flow of water to the tank is located below the freezing-line and in which provision is made for the discharge of the waste at each use of the seat.

The invention consists in the construction and arrangement of parts hereinafter described and claimed.

In the drawings, Figure 1 is an elevation, partially in section, of the attachment applied to a water-closet bowl. Fig. 2 is an enlarged longitudinal section of the branch pipe H, that connects with the bowl and its attachments. Fig. 3 is a similar sectional view through the case K of the mechanism which controls the flow of water to the tank.

A indicates the bowl, and B the soil-pipe provided with a trap $a$, which latter is located below the frost-line. As shown in the drawings, the bowl is located above a flooring C, and the trap is located in a cellar or a lower apartment.

D is the ordinary hinged seat, and, as here shown, is designed to stand in an elevated or inclined position when not in use. When it is depressed, it operates the mechanism that admits water into the tank E above the bowl.

F is the supply-pipe leading from the main, and G is the pipe leading to the tank and by which the latter is filled.

H is a branch pipe connecting with pipe G and opening to the interior of the bowl, through which branch pipe the flushing-water passes. Inside of the branch pipe is a valve-rod I, to which is attached a valve $b$, that closes against a seat $c$ to shut off the flushing-water, and around the valve-rod is a stiff spiral spring $d$, whose tendency is to throw the valve open, as shown in Fig. 2. The end of the valve-rod projects into the interior of the bowl and is provided with a friction-wheel $f$, that rests against a lug $g$, attached on the under side of the seat. The spring $d$ serves the double purpose of throwing the valve open and holding the seat elevated. When the seat is depressed, the lug $g$, striking the end of the valve-rod I, presses the same back against the spring and closes the valve against its seat, thereby cutting off the flushing-water from the bowl.

K is a valve which controls communication between the tank-pipe G and the supply-pipe F and between the tank-pipe and a drain-pipe, which latter communicates with and discharges into the soil-pipe. This valve is located below the frost-line, and, as shown, about on a level with the trap of the discharge-pipe. The supply-pipe F communicates with the casing of the valve at one end, and the tank-pipe G and drain-pipe L communicate with it from opposite sides at about its middle.

M and N are two valve-stems located inside of the casing, in opposite ends thereof, and resting in the same longitudinal line. These valve-stems are respectively provided with valves proper, $h$ $i$, which close in opposite directions against seats $k$ $l$ of a central barrel $m$, which divides the waterways. The stem M has a spiral spring $n$, which forces it inward and closes its valve against its seat. When so closed, the stem M strikes the stem N and opens the valve attached to the latter. The stem N projects through the end of the casing and has on its end a friction-wheel $o$, which rests against the end of a cranked lever P above. Said stem N is also provided with two projecting arms $p$ $p$, which ride in ways $r$ $r$ and thus keep the stem from turning.

The cranked lever P is pivoted at $s$ to a lug on top of the case and provided with a vertical arm $t$, which bears against the friction-wheel $o$. At the outer end of the lever is a counterweight $u$, whose tendency is to throw the lever down and its cranked end away from the friction-wheel $o$.

R is a lever pivoted at $v$ under the rim of the bowl. The rear end of this lever is connected with the long arm of the cranked lever P by a rod S. The front end of lever R is provided with a jointed stud $w$, which passes up loosely through a bearing $y$ and rests under and in contact with the seat, as shown in Fig. 1.

The operation is as follows: When the seat D is depressed, it strikes the stud $w$, throws the lever R, draws upon the rod S, and raises the rear end of the cranked lever P and causes its end $t$ to force the valve-stem N inward, thereby closing the valve $i$ and opening the valve $h$ by reason of the valve-stem N striking the end of valve-stem M and forcing the latter backward. The induction-water then flows from pipe F through the valve-opening K into the pipe G, and thence upward into the tank E. Such induction-water is cut off from the drain-pipe by the valve $i$. At the same time that the induction side of the valve is opened water is let on, and the valve $b$ in the branch pipe H is closed by reason of the lug $g$ on the under side of the seat striking the end of the valve-rod I and forcing it back. No part of the induction-water can therefore pass to the bowl. When the pressure is removed from the seat, the spring $d$ in the branch pipe H throws the valve-rod I forward, raises the seat, and opens the valve $b$ and allows the water in the tank to flow into the bowl. At the same time the spring $n$ closes the valve $h$, thus cutting off the induction-water, and opens the valve $i$ and allows connection between the pipe G and drain-pipe L. This allows the escape of all waste water that would otherwise stand above the frost-line.

Having described my invention, what I claim as new, and desire to secure by Letters Patent, is—

1. The combination of a bowl, a tank, a pipe communicating with the tank and extending below the bowl, a water-supply pipe communicating with the tank-pipe below the bowl, a valve controlling communication between said pipes, a pipe for conveying the water from the tank to the bowl, a valve controlling the flow of water through said pipe, a drain communicating with the tank-pipe below the bowl, and means for unseating the valve that controls communication between the supply-pipe and tank-pipe and at the same time seating the valve that controls the flow of water to the bowl, and vice versa, substantially as set forth.

2. The combination of a bowl, a tank, a pipe communicating with the tank and extending below the bowl, a water-supply pipe communicating with the tank-pipe below the bowl, a valve controlling communication between said pipes, a pipe branching from the tank-pipe and communicating with the bowl, a valve controlling communication between said branch pipe and tank-pipe, a drain communicating with the tank-pipe below the bowl, and means for unseating the valve that controls communication between the supply-pipe and tank-pipe and at the same time seating the valve that controls the branch pipe that communicates with the bowl, and vice versa, substantially as set forth.

3. The combination of a bowl, a tank, a pipe communicating with the tank, and extending below the bowl, a water-supply pipe and drain communicating with the tank-pipe below the bowl, a valve controlling communication between the tank-pipe and supply-pipe and between the tank-pipe and drain, a pipe branching from the tank-pipe and communicating with the bowl, a valve controlling said branch pipe, and means for so operating the valve that the branch pipe is closed when the tank-pipe is in communication with the supply-pipe and open when the tank-pipe is in communication with the drain, substantially as set forth.

4. The combination of a bowl, a hinged seat, a tank, a pipe communicating with the tank and extending below the bowl, a water-supply pipe communicating with the tank-pipe below the bowl, a valve controlling communication between said pipes, a pipe branching from the tank-pipe and communicating with the bowl, a valve controlling communication between said branch and tank pipes, a drain communicating with the tank-pipe below the bowl, and connections between the hinged seat and both of the valves aforesaid, whereby the depressing of the seat closes the branch pipe and opens the supply-pipe, and the elevating of the seat permits a reversal of these conditions, substantially as set forth.

5. The combination of a bowl, a hinged seat, a tank, a pipe communicating with the tank and extending below the bowl, a water-supply pipe and drain communicating with the tank-pipe below the bowl, a valve controlling communication between the tank-pipe and supply-pipe, and between the tank-pipe and drain, a pipe branching from the tank-pipe and communicating with the bowl, a valve controlling communication between branch pipe and tank-pipe, and connections between the hinged seat and both of said valves, whereby the depressing of the seat closes communication between the tank-pipe and branch pipe, and between the tank-pipe and drain, and establishes communication between the tank-pipe and supply-pipe, and the elevating of the seat permits a reversal of these conditions, substantially as set forth.

In witness whereof I have hereunto signed my name in the presence of two subscribing witnesses.

PATRICK J. MADDEN.

Witnesses:
GEO. B. SELDEN,
C. R. OSGOOD.